United States Patent [19]
Ejima et al.

[11] Patent Number: 5,438,363
[45] Date of Patent: Aug. 1, 1995

[54] CAMERA CAPABLE OF ADJUSTING WHITE BALANCE DURING UNDERWATER PHOTOGRAPHY

[75] Inventors: Satoshi Ejima, Setagaya; Masahiro Suzuki, Kawasaki, both of Japan

[73] Assignee: Nikon Corporation, Tokyo, Japan

[21] Appl. No.: 252,782

[22] Filed: Jun. 2, 1994

[30] Foreign Application Priority Data

Jun. 4, 1993 [JP] Japan .................. 5-134875

[51] Int. Cl.⁶ ............... H04N 5/225; H04N 5/235
[52] U.S. Cl. ............................ 348/223; 348/81; 354/64
[58] Field of Search ............ 348/81, 223, 277, 655; 354/64, 430, 432, 219; H04N 5/225, 235

[56] References Cited

U.S. PATENT DOCUMENTS

| | | | |
|---|---|---|---|
| 4,085,421 | 4/1978 | Gilmour | 348/81 |
| 4,470,680 | 9/1984 | Inagaki | 354/64 |
| 4,542,959 | 9/1985 | Kreutzig | 354/64 |
| 5,283,632 | 2/1994 | Suzuki et al. | 348/223 |
| 5,319,449 | 6/1994 | Saito | 348/223 |
| 5,325,185 | 6/1994 | Tsuchiya | 348/223 |

*Primary Examiner*—James J. Groody
*Assistant Examiner*—Glenton B. Burgess
*Attorney, Agent, or Firm*—Oliff & Berridge

[57] ABSTRACT

An electronic still camera is equipped with a white balance sensor and a white balance adjustment circuit so that when photographs are taken underwater (whether only the subject or both the camera and subject are underwater) the white balance in the vicinity of the camera can be measured and then used by the adjustment circuit to provide pictures having properly balanced colors. In one embodiment, a control circuit calculates a gain amount to be applied to the different color signals detected by an image sensor, and then the adjustment circuit uses these gains to adjust the image signals. The camera also may be equipped with an underwater discrimination sensor to determine whether the camera is underwater.

44 Claims, 10 Drawing Sheets

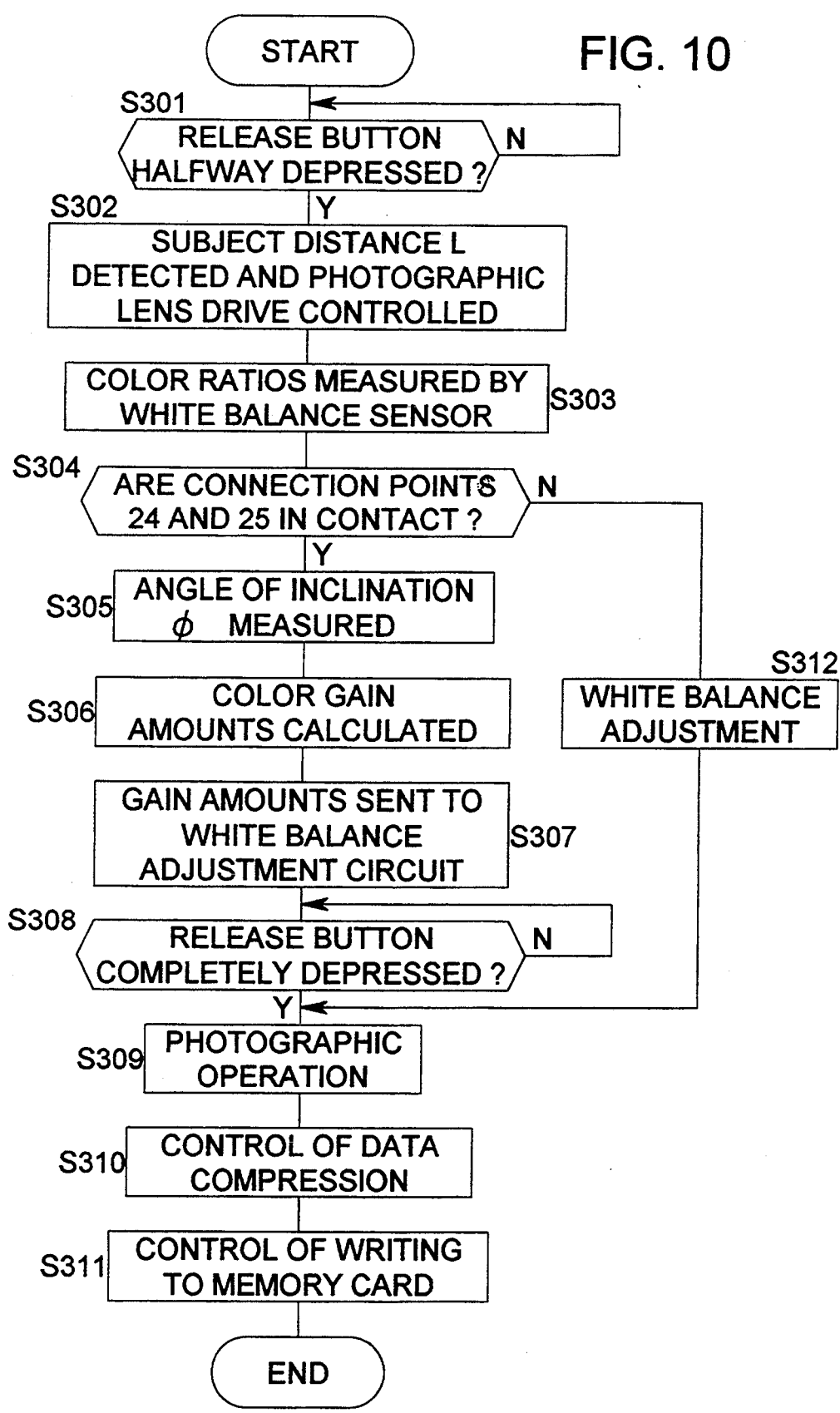

CAMERA CAPABLE OF ADJUSTING WHITE BALANCE DURING UNDERWATER PHOTOGRAPHY

BACKGROUND OF THE INVENTION

1. Field of the Invention

The present invention relates to an electronic still camera that is used for photographing underwater subjects.

2. Description of Related Art

In case of underwater photography, photographs tend to have a bluish color because the red color component in the light rays is absorbed by the water to a greater degree than are other color components. The rate of this absorption increases as water depth increases, and also increases as the distance between the camera and the subject increases. In order to compensate for the absorbed red color component in the light rays, an electronic flash device is conventionally used.

However, because the red color component of the light produced by the electronic flash device also is absorbed by the water, it also is necessary to compensate for this lost red color component. The use of a special film also has been considered to compensate for the red color component in case of underwater photography, but because such film accentuates the red color component to a fixed degree, there are cases in which it cannot reproduce the color of the original subject due to variations in water depth and in the distance between the camera and the subject.

SUMMARY OF THE INVENTION

It is an object of the present invention to provide an electronic still camera that, when the subject is underwater, can take photographs with a white balance approaching that of natural light by adjusting the white balance of the photography image based on the white balance in the vicinity of the electronic still camera and based on the relationship between the position of the subject and of the electronic still camera.

In order to achieve the above and other objects, and to overcome the shortcomings in the prior art, an electronic still camera equipped with structure that photographs a subject and outputs an image signal and recording structure that records the image signal, also is equipped with a white balance measuring device that measures the white balance in the vicinity of the camera and a white balance adjustment circuit that adjusts the white balance of the photographed image based on the measurements made by the white balance measuring device so as to compensate for the decrease in the red color component of light rays from the subject that enter the camera after passing through water. Consequently, even when the subject is underwater, photography can be performed with a white balance that is nearly equal to that of natural light.

The electronic still camera also can be equipped with an underwater discrimination device that determines whether the subject is underwater. The white balance adjustment circuit is controlled to adjust the white balance so as to compensate for the decrease in the red color component of light rays from the subject that enter the camera after passing through water when it is determined by the underwater discrimination device that the subject is underwater.

The electronic still camera also can be equipped with a water depth measuring device that measures the difference in water depth between the camera and the subject. The white balance adjustment circuit is controlled to adjust the white balance in accordance with the difference in water depth measured by the water depth measuring device.

The electronic still camera also can be equipped with a photographic selection device such as a switch that selects between the photography of a subject in the water and the photography of a subject on land. The white balance adjustment circuit is controlled to adjust the white balance so as to compensate for the decrease in the red color component of light rays from the subject that enter the camera after passing through water when photography of a subject that is in the water is selected using the photographic selection device.

The electronic still camera also can be equipped with a lighting device, such as a flash, that illuminates the subject. The white balance adjustment circuit also can adjust the white balance so as to compensate for the decrease in the red color component of light rays from the subject and from the lighting device that enter the camera after passing through water.

The electronic still camera also may be equipped with a distance measuring device that measures the subject distance, which is the distance between the camera and the subject. The white balance adjustment circuit can adjust the white balance in accordance with the subject distance measured by the distance measuring device.

The electronic still camera also can be equipped with a display device that displays, prior to picture taking, the image signal in which the white balance has been adjusted by the white balance adjustment circuit.

BRIEF DESCRIPTION OF THE DRAWINGS

The invention will be described in detail with reference to the following drawings in which like reference numerals refer to like elements and wherein:

FIG. 10 is a flowchart showing the operations of the control circuit of the fifth embodiment.

DETAILED DESCRIPTION OF THE PREFERRED EMBODIMENTS

First Embodiment

Figure 1:
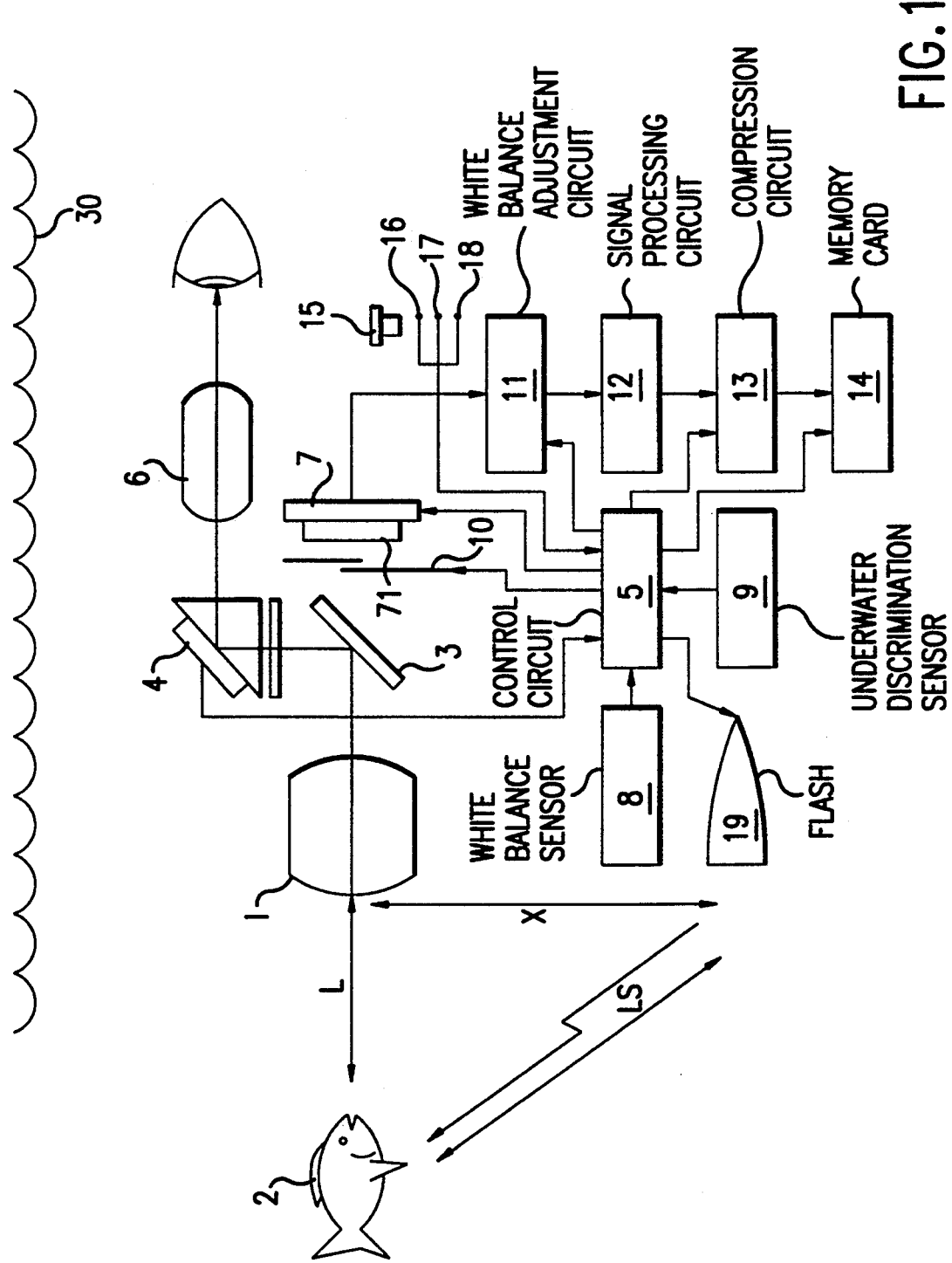
FIG. 1 is a block diagram of a first embodiment of an electronic still camera according to the present invention.

FIG. 1 is a drawing of the structure of a first embodiment of an electronic still camera (hereafter abbreviated to "camera") according to the present invention. Light rays from the subject 2 are guided to the 45° mirror 3 through the photographic lens 1. A photometry circuit 4 performs photometry using light rays reflected from the 45° mirror 3. The results of photometry are sent to a control circuit 5, which is explained below. Light rays incident on a photometry circuit 4 also are guided to the viewfinder 6. An imaging element 7, on which the light rays from the photographic lens 1 form an image, converts this image photoelectrically and output the image signal. An infrared cut filter 71 is mounted on the surface of imaging element 7. A sensor 8 measures the ratios of red, green and blue components of the light entering the camera. The sensor 8 can be a commonly known white balance sensor.

Figure 2:
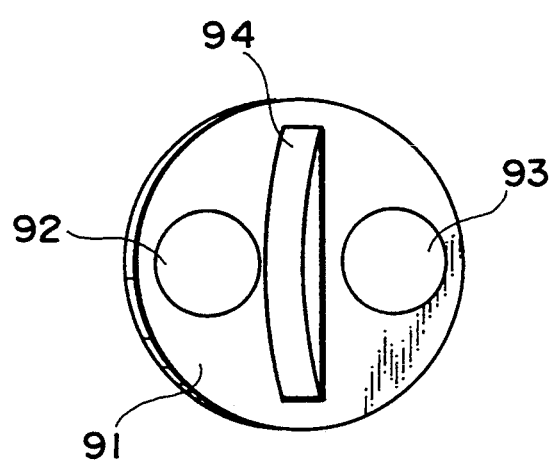
FIG. 2 is an exterior view of the underwater discrimination sensor used in the first embodiment.

An underwater discrimination sensor 9 detects whether the camera is underwater. As shown in FIG. 2, the underwater discrimination sensor 9 is formed of a water-repellant synthetic resin 91 on which electrodes 92 and 93 are placed with a certain spacing therebetween. A protrusion 94 is positioned between the electrodes 92 and 93. Lead wires (not shown in the figure) are connected to each of the electrodes 92 and 93, and a certain voltage from the camera is impressed on each of the electrodes 92 and 93 via these lead wires. Because the electrodes 92 and 93 are separated by the synthetic resin 91 and the protrusion 94, electric current does not flow between the electrodes 92 and 93 when the sensor 9 is in the air (i.e., on land).

On the other hand, when the camera is placed underwater, both of the electrodes 92 and 93 make contact with the water, and consequently, the electrical resistance between the electrodes 92 and 93 drops and a certain electric current flows between the electrodes 92 and 93. Accordingly, by detecting this change in electric current, it is possible to detect whether the camera is underwater. In addition, because there are concerns that water droplets might cling between the electrodes 92 and 93 so that current continues to pass between the electrodes 92 and 93 when the camera is moved from the water to land, the water-repellant synthetic resin 91 is used. Additionally, the protrusion 94 between the electrodes 92 and 93 is added so that water droplets cannot extend between the electrodes 92 and 93, and so that the photographer cannot touch both of the electrodes 92 and 93 simultaneously with a wet finger.

Preferably, the underwater discrimination sensor 9 is mounted in a location such as on the side or on the bottom of the camera so it is not affected by rain water.

An explanation of the structure of the first embodiment is provided hereafter, with reference to FIG. 1. In this example, the control circuit 5 calculates the gains used to adjust the white balance as well as controls compression of the image signal and opening and closing of the shutter 10. A white balance adjustment circuit 11 adjusts the white balance by applying the differing gains in accordance with the red, green and blue components of the image signal as output from the imaging element 7. A signal processing circuit 12 adjusts changes in the color and brightness of the image by performing γ compensation and profile compensation, as is well known, with respect to the image signal in which the white balance has been adjusted. A compression circuit 13 converts the output of the signal processing circuit 12 to a digital signal and compresses it, after which the signal is recorded in a memory, such as, for example, on the memory card 14. Connection points 16 and 17 contact each other when a release button 15 is depressed halfway, while the connection points 17 and 18 contact each other when the release button 15 is depressed completely. The contact information of these connection points is sent to the control circuit 5. Reference numeral 30 shows the surface of the water.

An explanation of the action of the first embodiment is provided hereafter, with reference to FIG. 1.

When the release button 15 is depressed halfway, the electronic still camera performs the photographic preparation operations detailed below. First, the white balance of the light incident on the camera is measured by the white balance sensor 8, and the underwater discrimination sensor 9 detects whether the camera is underwater.

When the release button 15 is depressed completely under these conditions, the camera performs the photographic operations detailed below.

Following a command from the control circuit 5, the 45° mirror 3 withdraws from the optical path, upon completion of which a diaphragm, not shown in the figure, that is mounted on the photographic lens 1 is set to a certain aperture diameter and the shutter 10 is opened for a set time interval. Through these operations, light from the subject 2 is formed as an image on the imaging element 7. The image signal that is the output of the imaging element 7 is input into the white balance adjustment circuit 11. In the white balance adjustment circuit 11, the white balance of the image signal is adjusted following commands from the control circuit 5. In other words, when the underwater discrimination sensor 9 detects that the camera is underwater, the ratios of the various color amounts detected by the white balance sensor 8 are compensated based on the equations shown below in order to give ratios that are nearly that of natural light.

The ratios of red, green and blue light amounts in natural light are referred to as $R0:G0:B0$ (where $R0+G0+B0=1$). The ratios in natural light received by a subject underwater are referred to as $R1:G1:B1$ (where $R1+G1+B1=1$), and the ratios measured by the white balance sensor 8 underwater are referred to as $R2:G2:B2$ (where $R2+G2+B2=1$).

Because there normally will be no difference in how far the subject 2 and the electronic still camera are located below the surface of the water, the ratios in the natural light reflected by the subject 2 and the ratios measured by the white balance sensor 8 can be considered equal, and it is possible to use the approximation $(R2:G2:B2)=(R1:G1:B1)$.

In addition, when the electronic still camera receives the amount of light from the subject 2, it is known that this amount of light decreases exponentially before it reaches the camera, with the exponent being comprised of the distance L between the camera and the subject 2 (hereafter referred to as the subject distance). In other words, taking $\alpha$, $\beta$ and $\gamma$ as constants, the red component is diminished by $\alpha^L$, the green component by $\beta^L$ and the blue component by $\gamma^L$, so that the ratios in the light from the subject 2 that forms an image on the imaging element 7 become $R2*\alpha^L:G2*\beta^L:B2*\gamma^L$. Accordingly, the red, green and blue components in the output from the imaging element 7 (i.e., the red, green and blue component signals) can be made close to the ratios $R0:G0:B0$ in natural light by applying different gains to each of the components using the equations shown below.

The gain for the red component is:

$$\frac{R0}{R2 \cdot \alpha^L} \qquad (1)$$

The gain for the green component is:

$$\frac{G0}{G2 \cdot \beta^L} \qquad (2)$$

The gain for the blue component is:

$$\frac{B0}{B2 \cdot \gamma^L} \qquad (3)$$

The control circuit 5 adjusts the white balance by applying gains to the color component outputs from the imaging element 7 based on equations (1) through (3).

In the equations given above, the subject distance L changes with the photographic conditions, but absorption of the red component is smaller when the subject distance L is decreased. In addition, there are concerns that when the subject distance L is large, applying gains based on equations (1) through (3) will yield an image in which the red component is over-emphasized. Accordingly, the subject distances for which the gain adjustments given by the above equations are effective fall in a limited range (about 5–10 meters). Consequently, the gains from equations (1) through (3) are computed supposing a certain preset value (such as 10 meters) for the subject distance L.

The constants $\alpha$, $\beta$ and $\gamma$ used in equations (1) through (3) are preset in the control circuit 5. As concrete values, in the case of natural light (R0:G0:B0=0.33:0.33:0.33) and L=10 meters, the red component in general will be reduced by half. Therefore, for instance, $\beta$ and $\gamma$ are both set at 1, and $\alpha$ is set at 0.93.

In addition, it also would be appropriate to change $\alpha$, $\beta$ and $\gamma$ in accordance with the focal length of the lens. For instance, when a wide angle lens is used, because the photographed field is wide, non-primary subjects positioned closer to the camera than the primary subject will be overcompensated and parts of the photographed image will appear reddish. Consequently, it would be appropriate to have the values for $\alpha$, $\beta$ and $\gamma$ approach 1 when a wide angle lens is used. In this way, the values of $\alpha$, $\beta$ and $\gamma$ can be selected based on the focal length of the camera used, and it would be appropriate to have a table of these values stored in the control circuit 5 or in a memory not shown in the drawing.

In this way, the image signal which has been compensated by the white balance adjustment circuit 11 is sent to the signal processing circuit 12, and after $\gamma$ compensation and profile compensation have been performed, the signal is converted into a digital signal and data compression is performed by the compression circuit 13, and the signal is then stored on the memory card 14.

Figure 3:
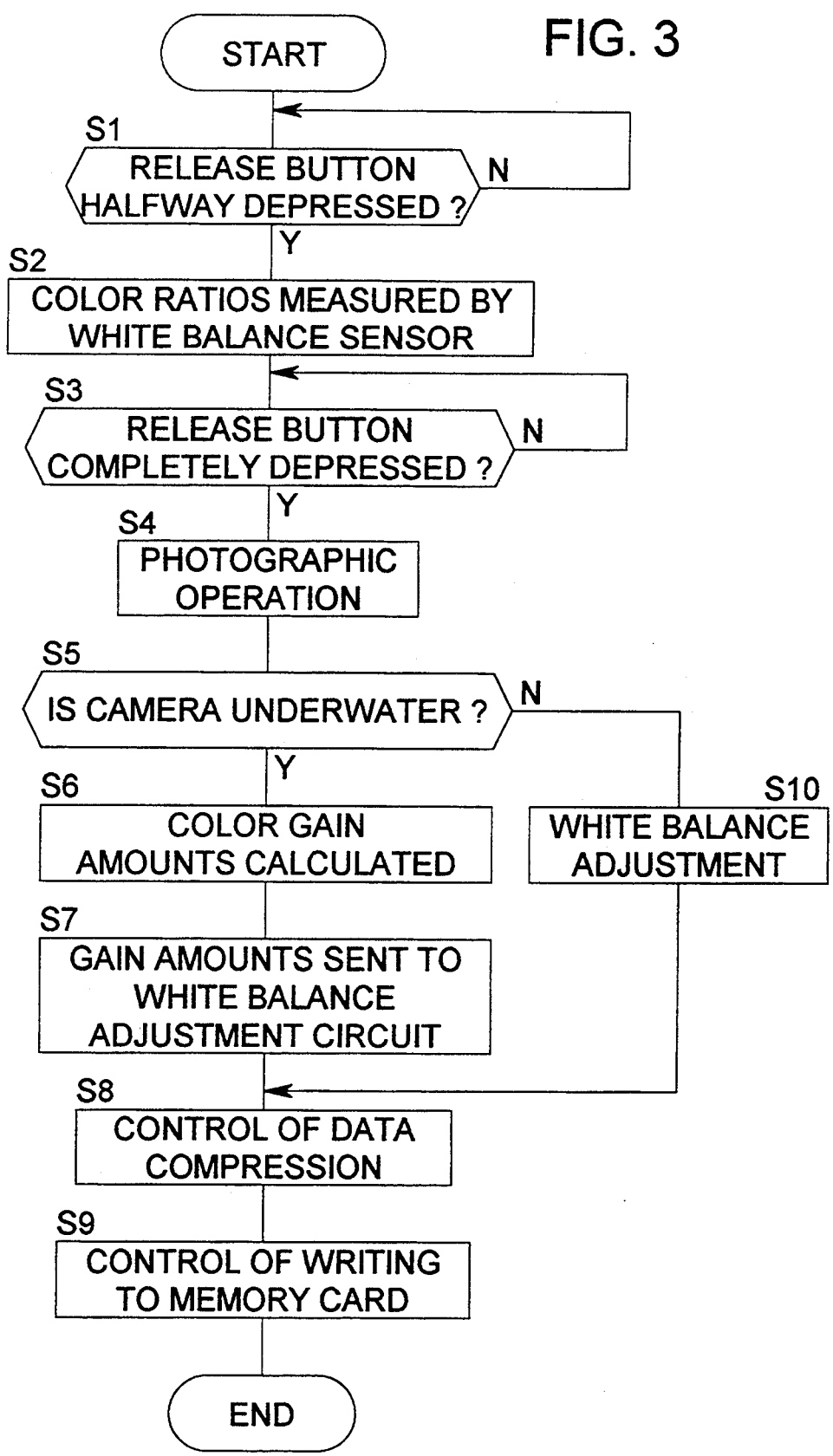
FIG. 3 is a flowchart showing the operations of the control circuit of the FIG. 1 embodiment.

FIG. 3 is a flowchart showing the actions of the control circuit 5 shown in FIG. 1. The actions of this flowchart start when a main switch of the camera, not shown in the drawing, is turned on.

In step S1, the determination is made as to whether the release button 15 is depressed halfway, and if it is depressed halfway, the procedure moves to step S2. In step S2, the ratios of various color amounts R2:G2:B2 are found using the white balance sensor 8, and the procedure then moves to step S3. In step S3, the determination is made as to whether the release button 15 is depressed completely. If release button 15 is depressed completely, the photographic action is performed in step S4, after which the procedure moves to step S5 and determines whether the camera is underwater. If the camera is underwater, the procedure moves to step S6, in which the gain amounts are found using equations (1) through (3) based on the ratios R2:G2:B2 found in step S2, the ratios R0:G0:B0 found in natural light, which are preset into the control circuit 5, the constants $\alpha$, $\beta$ and $\gamma$, and the subject distance L. Flow then proceeds to step S7. In step S7, the gain amounts calculated are sent to the white balance adjustment circuit 11, and the procedure then advances to step S8. In step S8, the control circuit 5 controls data compression (by the compression circuit 13) of the image signal in which the white balance has been adjusted by the white balance adjustment circuit 11, for instance, the control circuit 5 presets a compression ratio or the like, and the procedure then moves to step S9. In step S9, the compressed image data is stored on the memory card 14, and the process is then complete.

On the other hand, when it is determined in step S5 that the camera is not underwater, flow proceeds to step S10 and the white balance is adjusted using common methods for white balance adjustment, in other words so that the signal strength for red, green and blue are all equal in photographing of white subjects. The process is then completed by performing steps S8 and S9.

In FIG. 3, the underwater discrimination sensor 9 detects whether the camera is underwater after the release button 15 has been depressed completely. However, it also would be appropriate to detect whether the camera is underwater when the release button is depressed halfway.

In this way, when the camera according to the first embodiment is used underwater, the white balance is adjusted using a preset value estimating the subject distance, thereby realizing with a simple process a photographic image having the same color ratios as natural light.

In the electronic still camera shown in FIG. 1, the brightness is supplemented by illuminating the subject with an electronic flash device 19 when the water depth is great or when natural light is weak. However, because the red component in light produced by the electronic flash device 19 also is absorbed by the water, it is necessary to adjust the white balance anticipating the degree of this absorption.

When the electronic flash device 19 is used underwater, the flash device 19 is generally used to produce light at a position separated from the camera owing to concerns that if the electronic flash device 19 produces light immediately near to the camera, floating matter directly in front of the camera will be illuminated. Consequently, the control circuit 5 adjusts the white balance in the manner described below taking the distance between the camera and the electronic flash device 19 to be X and the distance between the subject 2 and the electronic flash device 19 to be LS, as indicated in FIG. 1.

First, the distance LS between the subject 2 and the electronic flash device 19 is found from the following equation using the distance X between the camera and the electronic flash device 19 and the value L estimated as the subject distance (for instance, 10 meters).

$$L_S = \sqrt{L^2 + X^2} \tag{4}$$

Because the light produced by the electronic flash device 19 is very close to natural light, the ratios of various color amounts in the light are taken to be the same R0:G0:B0 as in natural light, and the ratios in the light produced by the electronic flash device 19 (hereafter referred to as flash device light) that the subject 2 receives become:

$$R0 \cdot \alpha^{LS}: G0 \cdot \beta^{LS}: B0 \cdot \gamma^{LS}$$

In addition, because the flash device light illuminating the subject 2 passes through water for a distance L in returning to the camera, the total distance for which the flash device light passes through the water becomes LS+L. As a result, the ratios of various color amounts in the flash device light that is incident on the white balance sensor 8 of the camera become:

$$R0 \cdot \alpha^{LS+L}: G0 \cdot \beta^{LS+L}: B0 \cdot \gamma^{LS+L}$$

Accordingly, in case of photography using the electronic flash device 19 in a place where very little natural light is present, for instance in an underwater cave or the like, the control circuit 5 adjusts the white balance using the gains given by the following equations.

The gain for the red component is:

$$\frac{R0}{R0 \cdot \alpha^{Ls+L}} \tag{5}$$

The gain for the green component is:

$$\frac{G0}{G0 \cdot \beta^{Ls+L}} \tag{6}$$

The gain for the blue component is:

$$\frac{B0}{B0 \cdot \gamma^{Ls+L}} \tag{7}$$

When a non-primary subject is located closer to the electronic flash device 19 than is the primary subject, the non-primary subject is illuminated with a stronger light, owing to which there are concerns that parts of the photographic image might appear reddish. Accordingly, it also would be appropriate in this case for values close to 1 to be selected as the values of $\alpha$, $\beta$ and $\gamma$ in equations (5) through (7).

In addition, when some degree of natural light is present and photography is performed using both natural light and flash device light, the control circuit 5 adjusts the white balance using the gains given by the following equations, where $\Phi:\omega$ is the ratio of the exposure from natural light to the exposure from flash device light (with $\Phi+\omega=1$).

The gain for the red component is:

$$\frac{R0}{\Phi \cdot (R2 \cdot \alpha^L) + \omega \cdot (R0 \cdot \alpha^{Ls+L})} \tag{8}$$

The gain for the green component is:

$$\frac{G0}{\Phi \cdot (G2 \cdot \beta^L) + \omega \cdot (GO \cdot \beta^{Ls+L})} \tag{9}$$

The gain for the blue component is:

$$\frac{B0}{\Phi \cdot (B2 \cdot \gamma^L) + \omega \cdot (BO \cdot \gamma^{Ls+L})} \tag{10}$$

In equations (8) through (10), when T is taken to be the appropriate exposure found by the photometry circuit 4, if T1 is the exposure from natural light, and T2 is the exposure from light produced by the electronic flash device 19, because the three have the relationship T=T1+T2, $\Phi$ and $\omega$ are determined from the relationship T1:T2=$\Phi:\omega$.

With the first embodiment explained above, the subject distance L is an estimated value, but it would also be appropriate to use a value that is selected from among a range of preset values. In particular, making this kind of selection available would be effective when photography of an underwater subject 2 is performed with a camera that is not underwater.

Second Embodiment

With the first embodiment, the white balance is adjusted under the premise that the camera and the subject 2 are at the same depth under the surface of the water. However, in actuality, there are cases where the photographed subject 2 is closer to the surface of the water than is the camera, and, conversely, cases where the photographed subject 2 is farther underwater than is the camera. In these types of cases, because the absorption of the red light component will differ because of the difference in depth between the camera and the subject 2, the white balance must be adjusted taking this difference in depth into consideration. Here, the second embodiment adds an inclination measuring sensor to the camera of the first embodiment, thus becoming a structure that can take the difference in depth between the camera and the subject 2 into consideration in adjusting the white balance.

Figure 4:
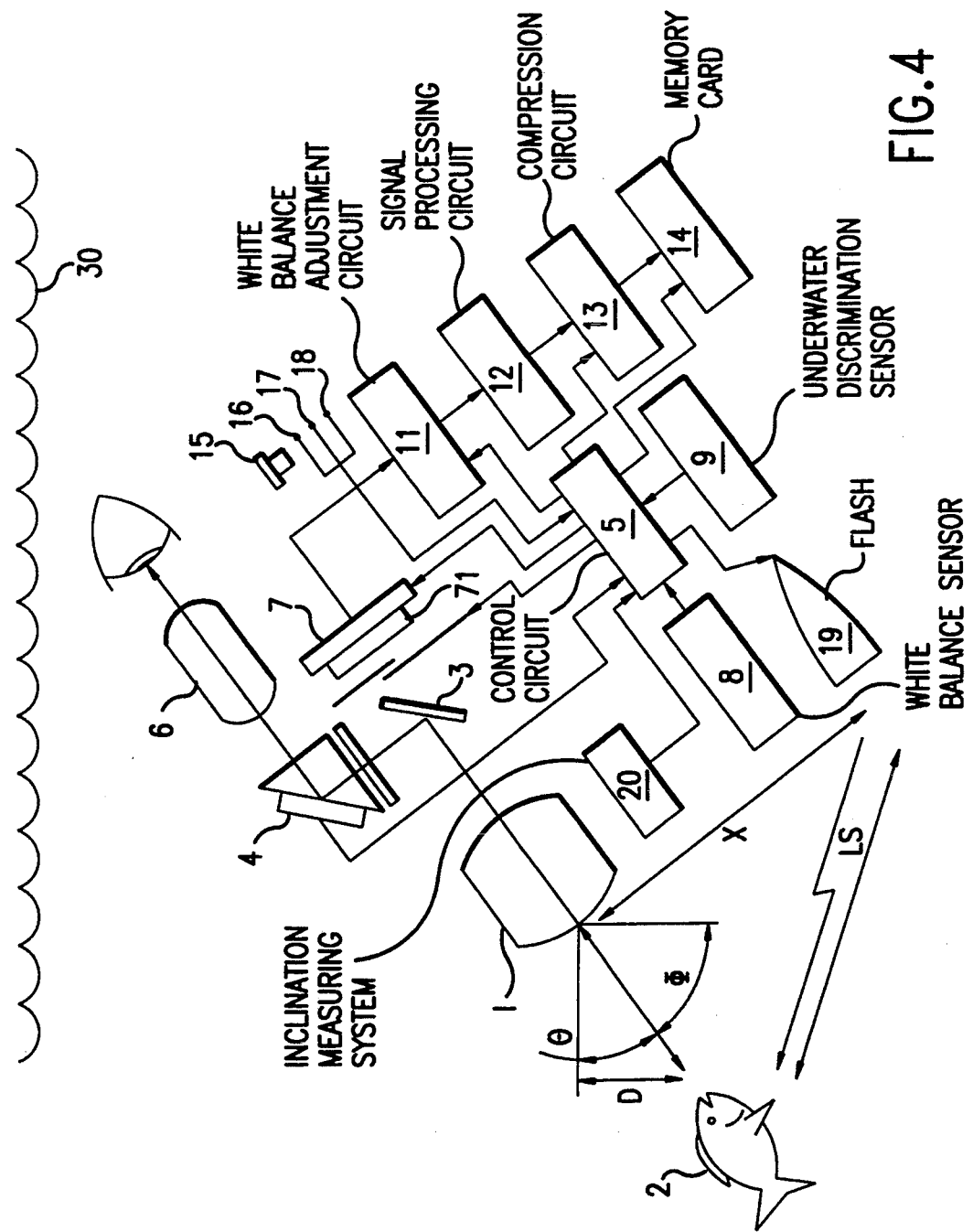
FIG. 4 is a block diagram of a second embodiment of an electronic still camera according to the present invention.

FIG. 4 is a block drawing of the second embodiment. In FIG. 4, items in common with FIG. 1 are labeled with the same symbols and explanation of such items is omitted here.

A commonly known inclination measuring sensor 20 detects the angle of camera inclination $\Phi$, or in other words to what degree the optical axis of the photographic lens 1 is inclined from the direction of increasing water depth. When the release button 15 is depressed halfway, the control circuit 5 reads the angle $\Phi$ from this inclination measuring sensor 20 and, by subtracting this value $\Phi$ from 90°, finds the angle $\theta$ that the camera is inclined at the time of photography. The difference D in depth between the camera and subject 2 is then found using the following equation.

$$D = L \cdot \sin\theta \tag{11}$$

In the above equation, $\theta = 90° - \Phi$, and L is the estimated value of the subject distance (for instance, 10 meters).

When there is a difference D in depth between the camera and the subject 2, the ratios of various color amounts received by the subject 2 are given by the following formula, where the ratios of various color amounts received by the camera are R2:G2:B2.

$$R2 \cdot \alpha^{L\sin\theta};\ G2 \cdot \beta^{L\sin\theta};\ B2 \cdot \gamma^{L\sin\theta}$$

Accordingly, the ratios of the subject light that forms an image on the imaging element 7 are given by the following formula.

$$R2 \cdot \alpha^{L(1+\sin\theta)};\ G2 \cdot \beta^{L(1+\sin\theta)};\ B2 \cdot \gamma^{L(1+\sin\theta)}$$

In order to adjust these ratios of the light from the subject 2, it is necessary to adjust the white balance by applying gains to the output of the imaging element 7 based on the following equations.

The gain for the red component is:

$$\frac{R0}{R2 \cdot \alpha^{L(1+\sin\theta)}} \quad (12)$$

The gain for the green component is:

$$\frac{G0}{G2 \cdot \beta^{L(1+\sin\theta)}} \quad (13)$$

The gain for the blue component is:

$$\frac{B0}{B2 \cdot \gamma^{L(1+\sin\theta)}} \quad (14)$$

In addition, when an electronic flash device 19 is used with the second embodiment, gains should be applied based on the following equations, similar to the case of the first embodiment.

The gain for the red component is:

$$\frac{R0}{\Phi \cdot (R2 \cdot \alpha^{L(1+\sin\theta)}) + \omega \cdot (R0 \cdot \alpha^{Ls+L})} \quad (15)$$

The gain for the green component is:

$$\frac{G0}{\Phi \cdot (G2 \cdot \beta^{L(1+\sin\theta)}) + \omega \cdot (G0 \cdot \beta^{Ls+L})} \quad (16)$$

The gain for the blue component is:

$$\frac{B0}{\Phi \cdot (B2 \cdot \gamma^{L(1+\sin\theta)}) + \omega \cdot (B0 \cdot \gamma^{Ls+L})} \quad (17)$$

Figure 5:
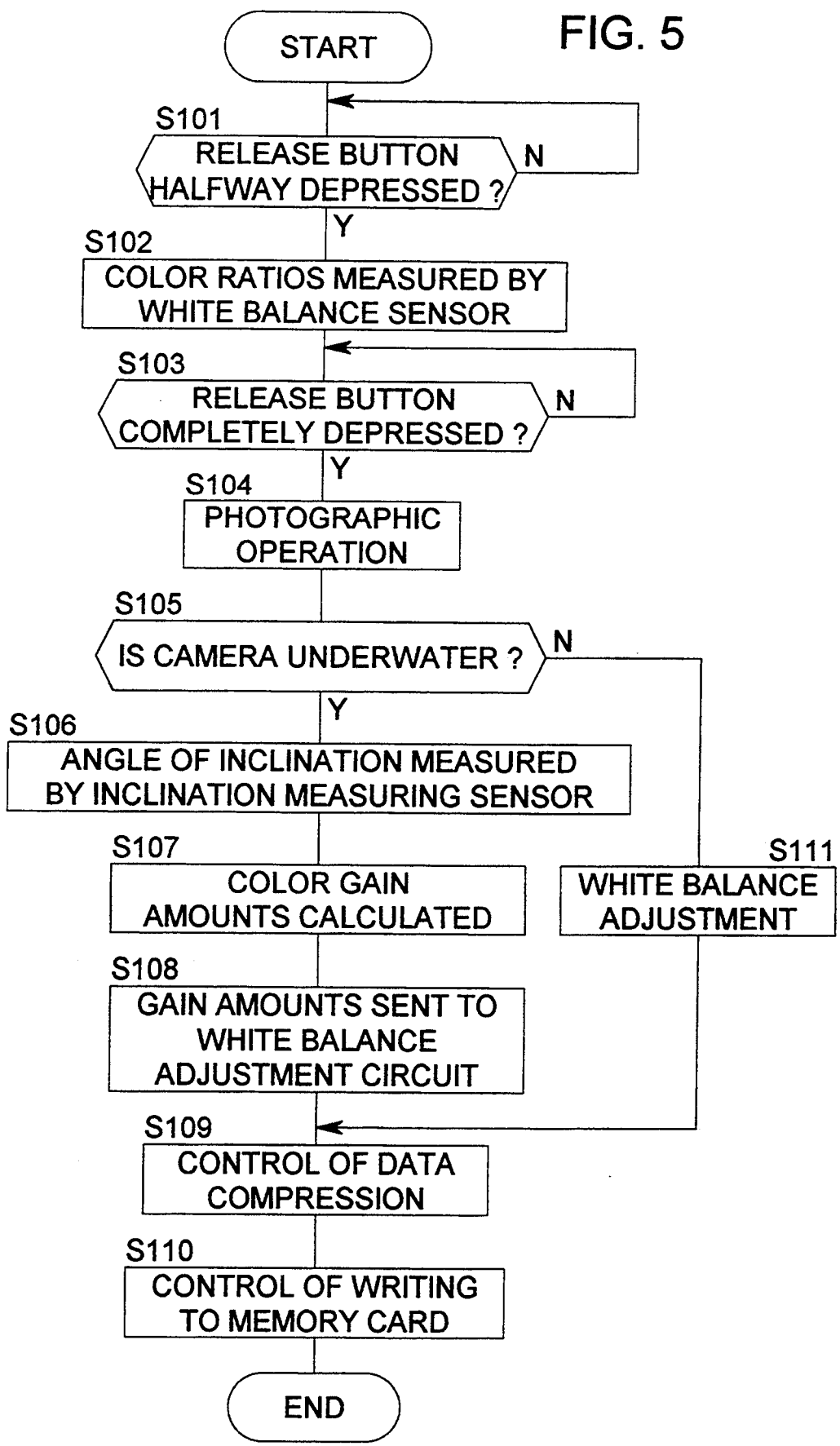
FIG. 5 is a flowchart showing the operations of the control circuit of the second embodiment.

FIG. 5 is a flowchart that shows the actions of the control circuit 5 shown in FIG. 4. The control circuit 5 starts the operations of this flowchart when a main switch, not shown in the drawing, is turned on.

In step S101, the determination is made as to whether the release button 15 is depressed halfway, and if it is depressed halfway, the procedure moves to step S102. In step S102, the ratios of various color amounts R2:G2:B2 are found using the white balance sensor 8, and the procedure then moves to step S103. In step S103, the determination is made as to whether the release button 15 is depressed completely. If release button 15 is depressed completely, the photographic action is performed in step S104, after which the procedure moves to step S105 and determines whether the camera is underwater. If the camera is underwater, the procedure moves to step S106, the angle of inclination $\Phi$ of the camera is measured by the inclination measuring sensor 20, and the procedure moves to step S107. In step S107, the gain amounts are found using equations (11) through (14) based on the ratios R2:G2:B2 found in step S102, the ratios R0:G0:B0 found in natural light, which are preset into the control circuit 5, the constants $\alpha$, $\beta$ and $\gamma$, the subject distance L, and the angle of inclination $\Phi$ of the camera, after which the procedure moves to step S108. In step S108, the gain amounts calculated are sent to the white balance adjustment circuit 11, and the procedure then advances to step S109. In step S109, the control circuit 5 controls data compression by the compression circuit 13 of the image signal in which the white balance has been adjusted by the white balance adjustment circuit 11, for instance, the control circuit 5 presets a compression ratio, and the procedure then moves to step S110. In step S110, the compressed image data is stored on the memory card 14, and the process is then complete.

On the other hand, when it is determined in step S105 that the camera is not underwater, the procedure moves to step S111 and the white balance is adjusted using common methods for white balance adjustment. The process is then completed by performing steps S109 and S110.

In FIG. 5, the inclination measuring sensor 20 detects the angle of inclination $\Phi$ of the camera after the release button 15 has been depressed completely. However, it also would be appropriate to detect the inclination angle when the release button 15 is depressed halfway.

In this way, with the second embodiment the difference in depth between the camera and the subject 2 is measured and the white balance is adjusted in accordance with this value, and consequently, photographs having the same color ratios as natural light can be obtained even when photographing a subject that is above or below the camera.

Third Embodiment

In the first and second embodiments described above, the subject distance L was taken to be a preset estimated value. However, because the decrease in the red light component is an exponential function with the subject distance L in the water as the exponent, there are cases where the ratios of various color amounts after the white balance was adjusted are different from the ratios in natural light because of the size of the subject distance L. In the third embodiment, which is explained below, the subject distance L is measured for each photograph, and the white balance is adjusted in accordance with this measured distance L.

Figure 6:
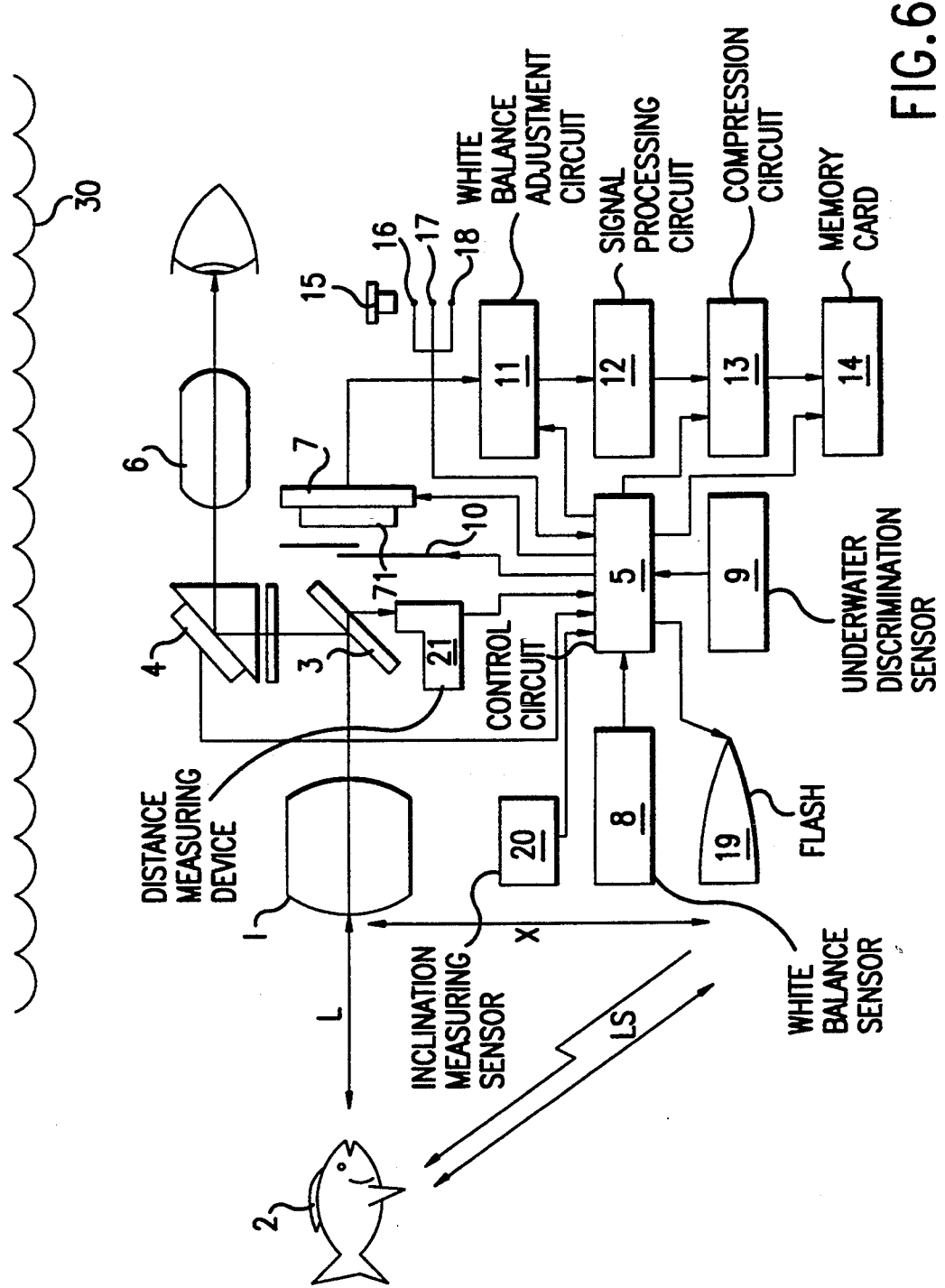
FIG. 6 is a block diagram of a third embodiment of an electronic still camera according to the present invention.

FIG. 6 is a block diagram of the third embodiment. Items in common with FIGS. 1 and 4 are labeled with the same symbols; hence an explanation of such items is omitted here.

A commonly known distance measuring device 21 measures the subject distance L from light reflected by a sub mirror (not shown in the drawing) and introduced into a distance measuring element (not shown in the drawing) which is located in the distance measuring device 21. There are several methods of measuring the distance. For instance, the subject distance L can be found by providing a fixed mirror, a moveable mirror and two photoelectric element arrays inside the distance measuring device 21, and by using the photoelectric element arrays to measure the difference in the intensity of light received as the moveable mirror is moved. Drive control of this moveable mirror and computation of the difference in light received by the photoelectric element arrays are performed by the control circuit 5, and through this the control circuit 5 calculates the subject distance L. In addition, the control circuit 5 focuses the subject image on the imaging element 7 by moving the photographic lens 1 in accordance with the calculated subject distance L.

Figure 7:
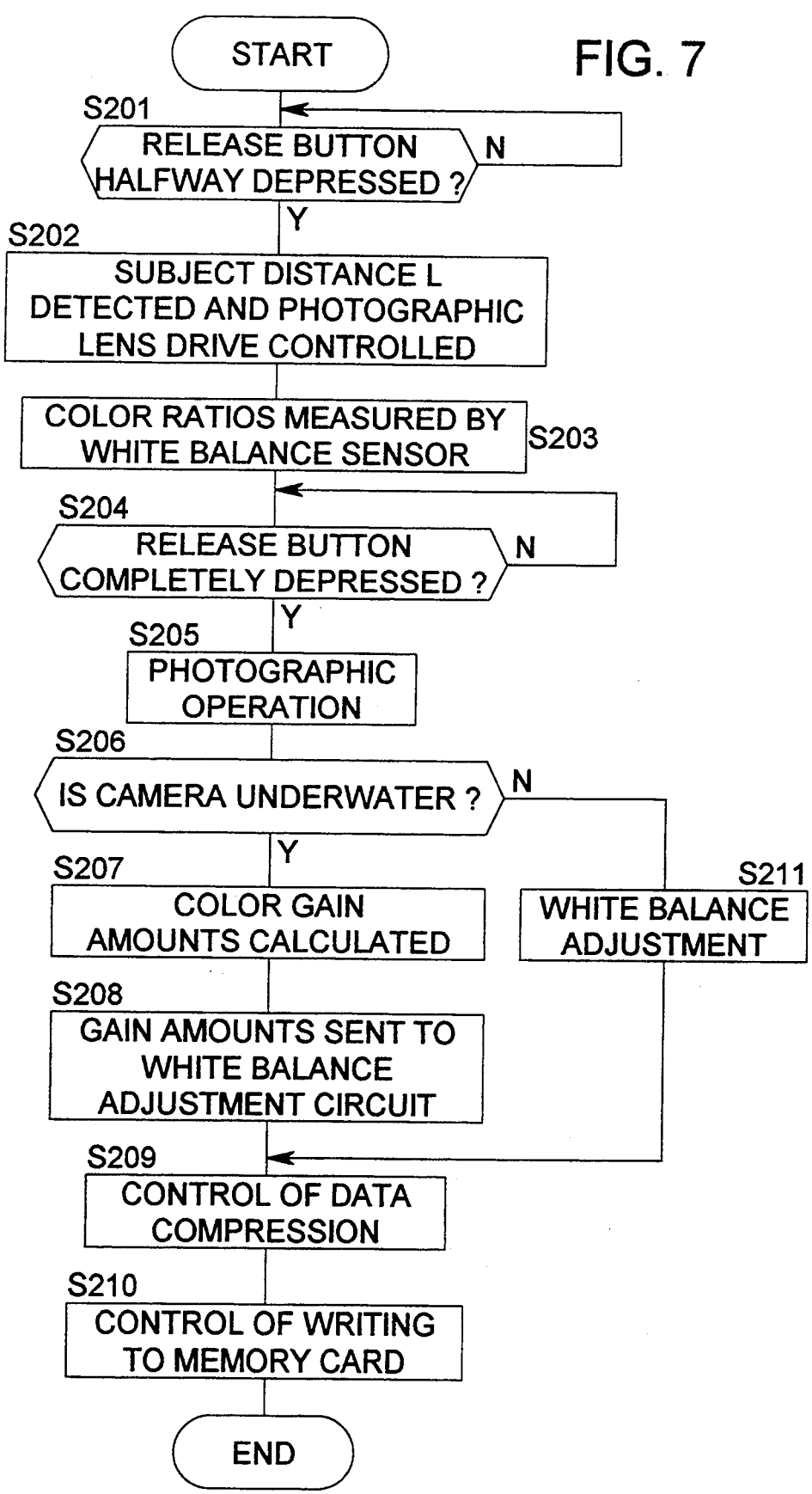
FIG. 7 is a flowchart showing the operations of the control circuit of the third embodiment.

FIG. 7 is a flowchart that shows the operations of the control circuit 5 shown in FIG. 6. The control circuit 5 starts the operations of this flowchart when a main switch (not shown) is turned on.

In step S201, the determination is made as to whether the release button 15 is depressed halfway. When release button 15 is depressed halfway, the procedure moves to step S202. In step S202, the control circuit 5 controls the distance measuring device 21 in order to measure the subject distance L and then adjusts the focus by moving the photographic lens 1 in accordance with this distance L, after which flow moves to step S203. In step S203, the ratios of various color amounts R2:G2:B2 are found using the white balance sensor 8, and the procedure then moves to step S204. In step S204, a determination is made as to whether the release button 15 is depressed completely. If button 15 is depressed completely, the photographic action is performed in step S205, after which the procedure moves to step S206 and a determination is made as to whether the camera is underwater. If the camera is determined to be underwater, the procedure moves to step S207, where the gain amounts are computed using the ratios found in step S203, following which the procedure moves to step S208. The computation of gain amounts in step S207 is accomplished using equations (1) through (3) as was the case with the first embodiment. The value measured in step S202 is used as the value L in equations (1) through (3). In step S208, the gain amounts calculated are sent to the white balance adjustment circuit 11, and the procedure then advances to step S209. In step S209, the control circuit 5 controls data compression by the compression circuit 13 of the image signal in which the white balance has been adjusted by the white balance adjustment circuit 11, for instance, the control circuit 5 presets a compression ratio and the procedure then moves to step S210. In step S210, the compressed image data is stored on the memory card 14, and the process is then complete.

On the other hand, if it is determined in step S206 that the camera is not underwater, the procedure moves to step S211 and the white balance is adjusted using common methods for white balance adjustment, and the process is then completed by performing steps S209 and S210.

When the subject distance L which was measured is too large, there are concerns that the red component will be overcompensated, and conversely, when the subject distance L is short, practically no compensation is needed. Because of this, it would be appropriate, after finding the subject distance L in step S202, to adjust the white balance using equations (1) through (3) only if it is determined that this subject distance L is within a preset range of values (for instance, 5 meters to 10 meters).

The values of $\alpha$, $\beta$ and $\gamma$ are preset in the control circuit 5 as they were in the first embodiment, but when multiple distance measuring elements are provided that measure the distance at multiple spots in the field of vision of the viewfinder and the subject distance L is found from the average of the various range measuring spots, there are concerns that parts of the photographic image will become reddish because when only part of the distance measuring spots are at a far distance, the subject distance L also becomes large. In this kind of case, it would also be appropriate for values near 1 to be selected as the values for $\alpha$, $\beta$ and $\gamma$.

With the third embodiment described above, as with the first embodiment, it is appropriate to use an electronic flash device 19. The gain amounts in this case are given by equations similar to equations (5) through (7). Here, the value measured in step S202 in FIG. 7 is used as the value for L in equations (5) through (7).

In addition, as with the second embodiment, it also would be appropriate to measure the difference in depth between the camera and the subject 2, or $L \cdot \sin \theta$, and to adjust the white balance using this value. The equations for computing the gain amounts in this case are similar to equations (12) through (14), and in this case also the value measured in step S202 is used as the value for L in equations (12) through (14).

In this way, with the third embodiment, the subject distance L is measured by a distance measuring device 21 and the gain amounts are computed in accordance with this distance, and because of this the white balance does not change even if the subject distance L changes.

With the third embodiment, the subject distance L is found from the amount of light received by distance measuring elements provided inside the distance measuring device 21. However, the structure of the distance measuring device 21 is not limited to this structure. For example, it would be appropriate to find the subject distance L by having a distance ring provided on the photographic lens and manually turning it, and by reading the value from the distance ring using a decoder.

The first through third embodiments described above have been explained for cases where both the camera and the subject 2 are underwater. However, the above embodiments also can be applied to cases where photography of an underwater subject 2 is performed with a camera on land. In this case, in place of an underwater discrimination sensor 9, a switch could be provided on the camera, for instance, that indicates that the subject 2 being photographed is underwater, so that when the switch is depressed the camera is made to recognize that it is being used to photograph subjects underwater.

Fourth Embodiment

In all three of the above embodiments, a camera that also can be used on land is presented, and the first operation in each is meant to detect whether the camera is underwater, the white balance being adjusted based on the results of this detection. In contrast to this, the fourth embodiment described below is an example of a camera designed specifically for use underwater.

Figure 8:
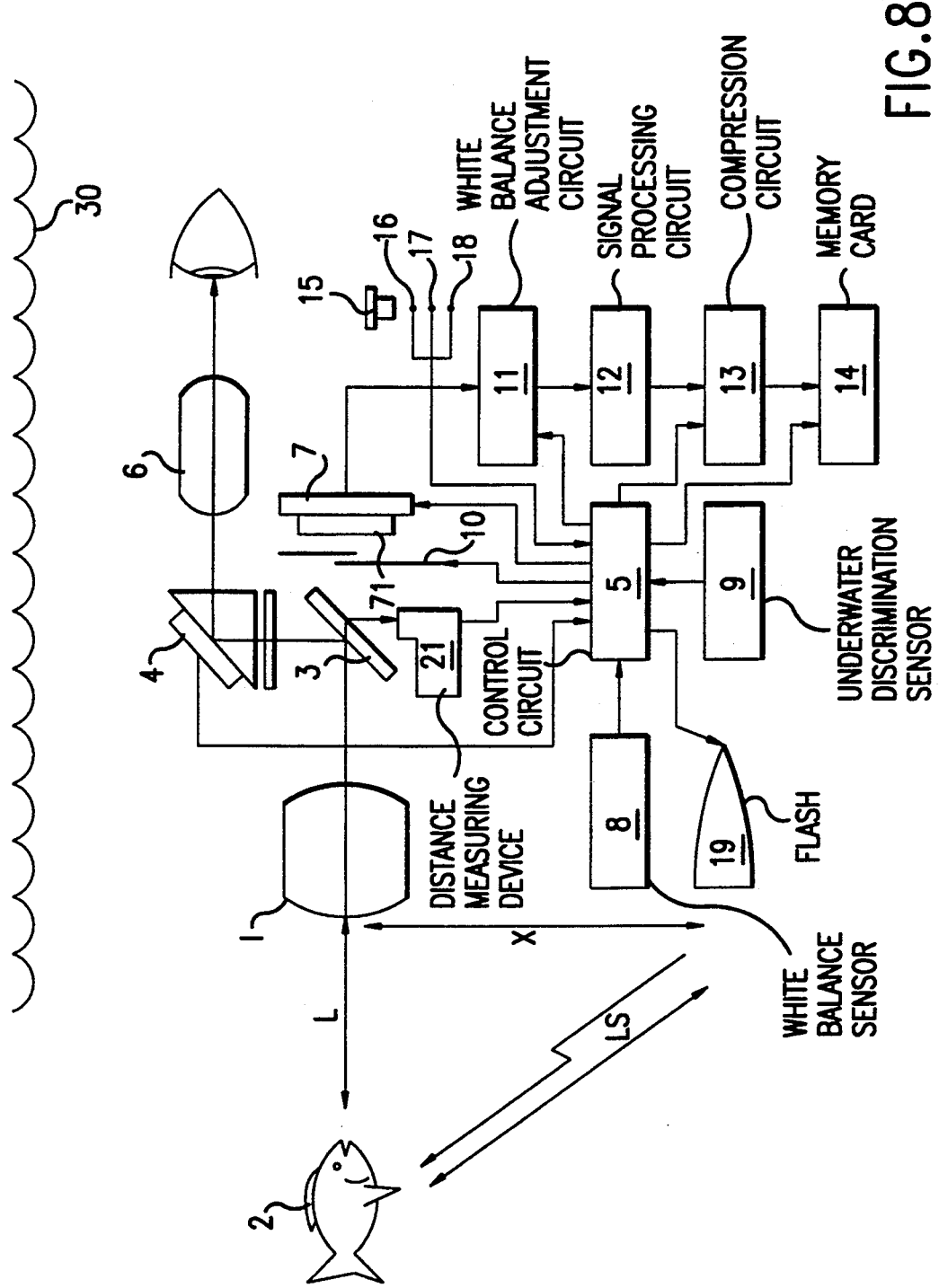
FIG. 8 is a block diagram of a fourth embodiment of an electronic still camera according to the present invention.

FIG. 8 is a block diagram of the fourth embodiment. Items in common with FIG. 1 are labeled with the same symbols and explanation of such items is omitted here. In addition, in this fourth embodiment the underwater discrimination sensor has been omitted because it is presumed from the outset that the camera is being used underwater.

The control circuit 5 shown in FIG. 8 performs operations similar to those in the flowchart shown in FIG. 7 for the third embodiment, but the process in step S206 of FIG. 7 is not performed because it is presumed that the camera is being used underwater.

In the fourth embodiment described above, as was the case with the first embodiment, it is appropriate to use an electronic flash device 19. In this case, the gain amounts are found using equations similar to equations (5) through (7). In this instance the value measured by the distance measuring device 21 is used as the value L in equations (5) through (7).

In addition, as with the second embodiment, it also would be appropriate to measure the difference in depth between the camera and the subject 2, or L·sin θ, and to adjust the white balance using this value. The equations in this case are similar to equations (12) through (14), and in this case also the value measured by the distance measuring device 21 is used as the value for L in equations (12) through (14).

In this way, with the fourth embodiment, because a camera specially designed for use underwater is used, determination of whether the camera is underwater is not necessary as it was in the first three embodiments. Accordingly, the processes performed by the control circuit 5 are reduced in number.

In all four of the embodiments presented above, the white balance is adjusted after the release button is depressed completely. However, it would be appropriate to adjust the white balance when the button is depressed halfway, and to store the results of this white balance adjustment on a recording medium such as the memory card 14 or the like after the release button 15 has been depressed completely, as is done in the fifth embodiment, which is explained below.

Fifth Embodiment

With the first four embodiments, when the camera is underwater the results of the adjustment to the white balance is written on the memory card 14. However, the photographer cannot know how the white balance was adjusted until he reads the contents written on the card. With the fifth embodiment, which is explained below, the results of the adjustment to the white balance can be verified with the viewfinder 6 before the data is written on the memory card 14.

Figure 9:
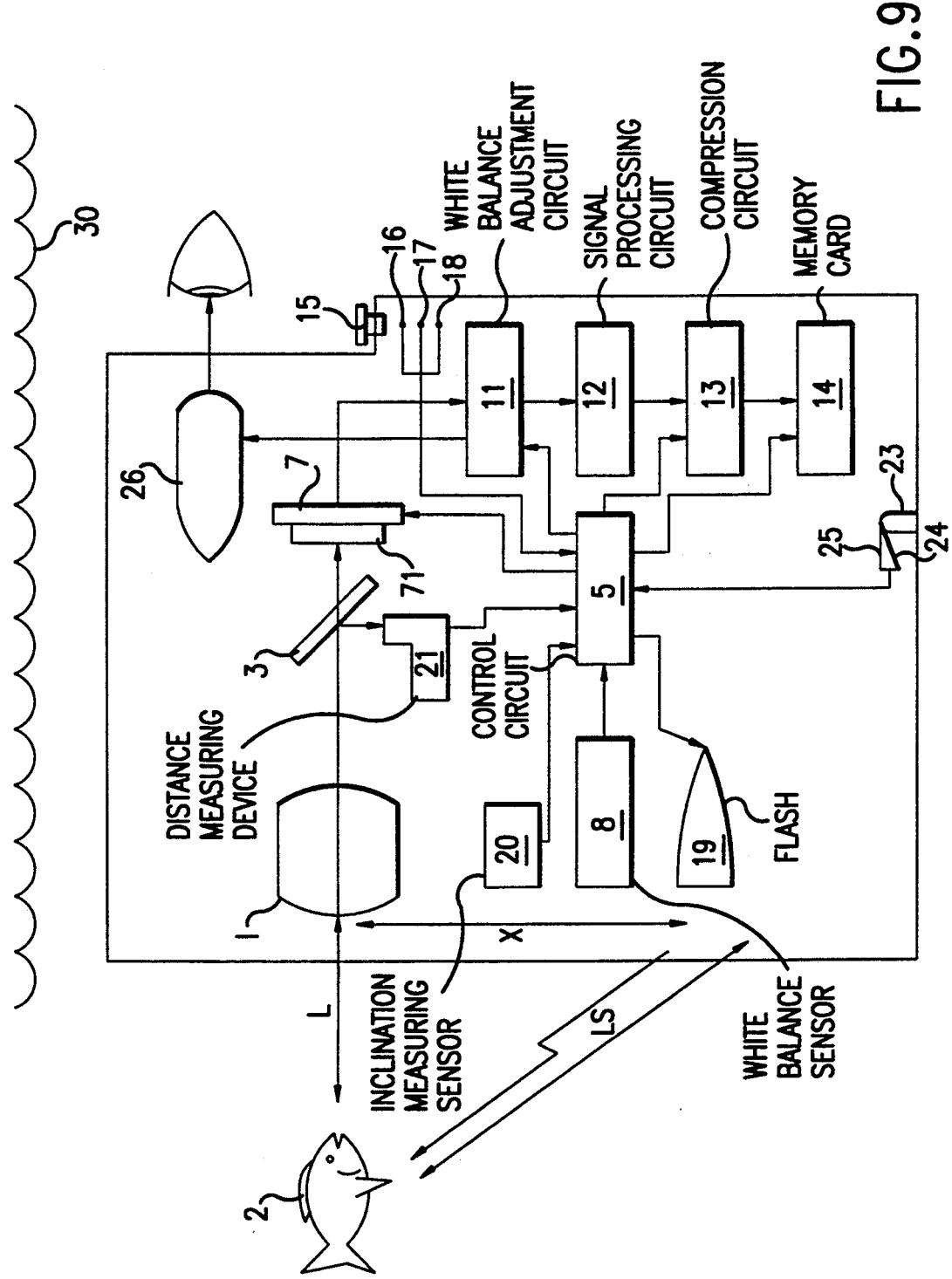
FIG. 9 is a block diagram of a fifth embodiment of an electronic still camera according to the present invention.

FIG. 9 is a block drawing of the fifth embodiment. Items in common with FIGS. 1 and 2 are labeled with the same symbols; hence an explanation of such items is omitted here.

An underwater housing 22 houses the camera. Because it is waterproof, the camera which is placed inside this housing does not get wet even when used underwater. Accordingly, even a camera without a waterproof structure can be used underwater. A protrusion 23 is provided on the bottom of the underwater housing 22. When the camera is inserted into the underwater housing, this protrusion 23 touches the connection point 24 on the camera, causing connection points 24 and 25 to come into contact. Thus, the control circuit 5 recognizes that the camera is being used underwater. Item 26 is an electronic viewfinder, and through it the photographer can directly verify visually the image signal that has been adjusted by the white balance adjustment circuit 11.

FIG. 10 is a flowchart that shows the operations of the control circuit 5 of the fifth embodiment. In step S301, the determination is made as to whether the release button 15 is depressed halfway, and if the release button 15 is depressed halfway the procedure moves to step S302. In step S302, the control circuit 5 controls the distance measuring device 21 in order to measure the subject distance L, and the focus is adjusted by moving the photographic lens 1 in accordance with this distance L, after which the procedure moves to step S303. In step S303, the ratios of various color amounts are found by the white balance sensor 8, and the procedure then moves to step S304. In step S304, the determination is made as to whether connection points 24 and 25 are in contact with each other, and if they are, the control circuit 5 recognizes that the camera is being used underwater and moves to step S305. In step S305, the angle of inclination Φ of the camera is measured by the inclination measuring sensor 20, and the procedure moves to step S306. In step S306, the gain amounts are calculated in accordance with the ratios found in step S303, and the procedure moves to step S307. The calculation of gain amounts performed in step S306 is performed using equations (12) through (14), similar to the third embodiment.

In step S307, the calculated gain amounts are sent to the white balance adjustment circuit 11. The white balance adjustment circuit 11 adjusts the white balance by applying gains based on the gain amounts calculated by the control circuit 5. The results of this white balance adjustment are sent to the signal processing circuit 12 as well as to the electronic viewfinder 26. Accordingly, the photographer can verify the image signal in which the white balance has been adjusted prior to taking the picture (i.e., before the release button 15 is depressed completely).

Next, the procedure moves to step S308, and a determination is made as to whether the release button 15 is depressed completely. If release button 15 is depressed completely, the photographic action is performed in step S309, after which the procedure moves to step S310. In step S310, the control circuit 5 controls data compression by the compression circuit 13 of the image signal in which the white balance has been adjusted by the white balance adjustment circuit 11, for instance, the control circuit 5 presets a compression ratio. The procedure then moves to step S311, where the compressed photographic data is stored in the memory card 14, and the process is then complete.

On the other hand, if it is determined in step S304 that the camera is not underwater, the procedure moves to step S312 and the white balance is adjusted using common methods for white balance adjustment, after which the process is completed by performing steps S309, S310 and S311.

In this way, with the fifth embodiment, the image signal in which the white balance has been adjusted can be verified via the electronic viewfinder 26 prior to its being written on the memory card 14. Consequently, a determination as to whether the white balance adjustment is correct can be made prior to taking the picture. Accordingly, by verifying this through the electronic viewfinder 26, the photographer can decide that the white balance has not been adjusted according to his desires, and the white balance can be readjusted by using an electronic flash device 19, for instance, thereby reducing photographic mistakes.

With the fifth embodiment described above, when an electronic flash device 19 is used, the equations used to compute the gain amounts are similar to equations (15) through (17).

In the fifth embodiment, the white balance is adjusted when the release button 15 is depressed halfway, the results of which can be verified through the electronic viewfinder 26 prior to picture taking, and consequently a pre-flash is necessary when an electronic flash device 19 is used. However, it also is possible to use a halogen lamp or the like in place of the electronic flash device 19 during photography. In this case, taking the ratios of various color amounts from the halogen lamp to be R3:G3:B3 (where R3+G3+B3=1), the gain amounts for the various colors under halogen lamp illumination are given by the following equations.

The gain for the red component is:

$$\frac{RO}{\Phi \cdot (R2 \cdot \alpha^{L(1+\sin\theta)}) + \omega \cdot (R3 \cdot \alpha^{Ls+L})} \quad (18)$$

The gain for the green component is:

$$\frac{GO}{\Phi \cdot (G2 \cdot \beta^{L(1+\sin\theta)}) + \omega \cdot (G3 \cdot \beta^{Ls+L})} \quad (19)$$

The gain for the blue component is:

$$\frac{BO}{\Phi \cdot (B2 \cdot \gamma^{L(1+\sin\theta)}) + \omega \cdot (B3 \cdot \gamma^{Ls+L})} \quad (20)$$

By this means, the white balance is adjusted under halogen lamp illumination, and the image can be verified through the electronic viewfinder 26 prior to picture taking.

A halogen lamp also can be used with the first four embodiments, and in this case the gain amounts are given by equations similar to equations (18) through (20).

With the fifth embodiment, an example was shown that uses an underwater housing 22, but it is not necessary to use this underwater housing 22 if the camera structure is waterproof. In addition, conversely, with the first four embodiments, it also would be appropriate to house the camera in an underwater housing 22. In this case, the underwater discrimination sensor 9 would be unnecessary.

In all five of these embodiments, the white balance sensor 8 is mounted on the side of the photographic lens 1 and measures the white balance in the vicinity of the camera, independent of the light rays that pass through the photographic lens 1. However, it also would be appropriate to measure the white balance from the image signal formed on the imaging element 7 by light that has passed through the photographic lens 1. In this manner, it is possible to change the range of white balance measurement for each type of lens used, whether a wide-angle lens or a telephoto lens, and because of this a white balance adjustment agrees better with the actual photographic conditions.

In addition, in all five of these embodiments, the image signal in which the white balance has been adjusted is stored on the memory card 14. However, it also would be appropriate to store on the memory card 14 the image signal in which the white balance has not been adjusted, and to record separate from that (for instance, on a free area of the memory card 14) photographic information such as the presence or absence of an electronic flash device 19, the color ratios, the depth of the subject, the subject distance, and the water depth at the time of photography and the like. Thereby, the white balance can be adjusted by composing these pieces of photographic information which are read each time the image signal is read from the memory card 14 with a reproduction device.

In embodiments structured in this way, the imaging element 7 functions as an imaging means, the memory card 14 functions as a recording means, the underwater discrimination sensor 9 functions as an underwater discrimination means, the white balance sensor 8 functions as a white balance measuring means, the white balance adjustment circuit 11 functions as a white balance adjustment means, the inclination measuring sensor 20 functions as a water depth measuring means, the electronic flash device 19 functions as a lighting means, the distance measuring device 21 functions as a distance measuring means, and the electronic viewfinder 26 functions as a display means.

As explained in detail above, with the present invention, the measured white balance is adjusted by the white balance adjustment means so as to compensate for the decrease in the red color component in light from the subject that has reached the camera after passing through water. Because of this, photography can be realized with a white balance close to that of natural light even when the subject is underwater.

Additionally, structure can be provided whereby a determination is made by an underwater discrimination means as to whether the subject is underwater. Because of this, the means of adjusting the white balance can be changed depending on whether the subject is underwater.

Further, structure can be provided whereby the difference in water depth between the camera and the subject is measured by a water depth measuring means, so that photography can be realized with a white balance close to that of natural light even when the subject is above or below the camera.

With the invention, when a lighting means is used, the white balance is adjusted by the white balance adjustment means so as to compensate for the decrease in the red color component in light from the lighting means and such light that is reflected and reaches the camera after passing through water. Because of this, a white balance close to that of natural light can be obtained even when an electronic flash device is used in underwater photography.

Further, it is possible to provide structure whereby the white balance is adjusted based on the subject distance found by the distance measuring means. Because of this, the white balance does not change even if the subject distance changes.

Additionally, the image signal in which the white balance has been adjusted can be displayed by a display means prior to picture taking. Because of this, the determination can be made prior to picture taking as to whether the white balance adjustment has been done according to the aims of the photographer, thereby avoiding photographic mistakes beforehand.

The described embodiments have separate circuits to perform the control, white balance adjustment, signal processing and signal compression functions. It is possible to perform these functions using one or more programmed processors, or application specific integrated circuits, for example.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

We claim:

1. An electronic still camera having an imaging element that outputs an image signal when a photographic subject is photographed by said imaging element, and a recording device that records the image signal, said camera comprising:
- white balance measuring means for measuring a white balance in a vicinity of the camera; and
- white balance adjustment means for adjusting the white balance of the image signal output by said imaging element based on the white balance measured by said white balance measuring means so as to compensate for decrease in a red color component of light rays from a photographed subject that enter the camera after passing through water.

2. The electronic still camera of claim 1, further comprising:
- underwater discrimination means for determining whether the photographed subject is underwater; said white balance adjustment means adjusting the white balance of said image signal when said underwater discrimination means determines that the photographed subject is underwater.

3. The electronic still camera of claim 1, further comprising:
- water depth measuring means for measuring a difference in water depth between said camera and said photographed subject; said white balance adjustment means adjusting said white balance of said image signal in accordance with the difference in water depth measured by said water depth measuring means.

4. The electronic still camera of claim 2, further comprising:
- water depth measuring means for measuring a difference in water depth between said camera and said photographed subject; said white balance adjustment means adjusting said white balance of said image signal in accordance with the difference in water depth measured by said water depth measuring means.

5. The electronic still camera of claim 1, further comprising:
- photography selection means for enabling photographer selection between photography of a subject in water and photography of a subject on land; said white balance adjustment means adjusting said white balance of said image signal when photography of the photographed subject in the water is selected using said photography selection means.

6. The electronic still camera of claim 1, further comprising:
- light means for illuminating said photographed subject; said white balance adjustment means further adjusting the white balance of said image signal so as to compensate for the decrease in the red color component of light rays from the light means that enter the photographed subject to reflect and reach the camera after passing through water.

7. The electronic still camera of claim 4, further comprising:
- light means for illuminating said photographed subject; said white balance adjustment means further adjusting the white balance of said image signal so as to compensate for the decrease in the red color component of light rays from the light means that enter the photographed subject to reflect and reach the camera after passing through water.

8. The electronic still camera of claim 5, further comprising:
- light means for illuminating said photographed subject; said white balance adjustment means further adjusting the white balance of said image signal so as to compensate for the decrease in the red color component of light rays from the light means that enter the photographed subject to reflect and reach the camera after passing through water.

9. The electronic still camera of claim 1, further comprising:
- distance measuring means for measuring a subject distance between said camera and said photographed subject; said white balance adjustment means adjusting the white balance of said image signal in accordance with the subject distance measured by said distance measuring means.

10. The electronic still camera of claim 7, further comprising:
- distance measuring means for measuring a subject distance between said camera and said photographed subject; said white balance adjustment means adjusting the white balance of said image signal in accordance with the subject distance measured by said distance measuring means.

11. The electronic still camera of claim 8, further comprising:
- distance measuring means for measuring a subject distance between said camera and said photographed subject; said white balance adjustment means adjusting the white balance of said image signal in accordance with the subject distance measured by said distance measuring means.

12. The electronic still camera of claim 1, further comprising:
- display means for displaying, prior to picture taking, the image signal after the white balance of the image signal has been adjusted by the white balance adjustment means.

13. The electronic still camera of claim 10, further comprising:
- display means for displaying, prior to picture taking, the image signal after the white balance of the image signal has been adjusted by the white balance adjustment means.

14. The electronic still camera of claim 11, further comprising:
- display means for displaying, prior to picture taking, the image signal after the white balance of the image signal has been adjusted by the white balance adjustment means.

15. The electronic still camera of claim 1, wherein said white balance adjustment means adjusts gains of red, green, and blue components of the image signal output by said imaging element.

16. The electronic still camera of claim 15, further comprising control means for calculating gains to be applied to said red, green, and blue color components of said image signal, said white balance adjustment means adjusting the gains of said red, green, and blue components of said image signal in accordance with said calculated gains.

17. The electronic still camera of claim 2, wherein said underwater discrimination means determines whether the photographed subject is underwater by determining whether said camera is underwater.

18. The electronic still camera of claim 17, wherein said underwater discrimination means includes a sensor having two electrodes located on an outer surface of the camera, said sensor detecting a voltage potential between said two electrodes.

19. The electronic still camera of claim 2, wherein said underwater discrimination means determines whether the camera is located in a waterproof casing to determine whether said camera is underwater.

20. The electronic still camera of claim 3, wherein said water depth measuring means includes means for measuring an inclination of said camera, said water depth measuring means determining said difference in water depth between said camera and said photographed subject based upon said measured inclination and a distance between said camera and said subject.

21. The electronic still camera of claim 20, wherein said distance is a predetermined distance.

22. The electronic still camera of claim 20, wherein said distance is measured by a distance measuring means for measuring a distance between said camera and said subject.

23. An electronic still camera comprising:
a photoelectric imaging element that outputs an image signal when a photographic subject is photographed by said photoelectric imaging element;
a lens system that forms a light image of a photographed subject on said imaging element;
said photoelectric imaging element outputs said image signal based on said light image;
a white balance measuring device that measures a white balance of light in a vicinity of the camera;
a controller coupled to said white balance measuring device to receive the measured white balance of light in the vicinity of the camera to produce a color balance adjustment signal that compensates for decrease in a red color component of light rays from the photographed subject that enter the camera after passing through water; and
a white balance adjustment device, coupled to said photoelectric imaging element output and to said controller, to adjust a white balance of said image signal output by said photoelectric imaging element based on said color balance adjustment signal and to output an adjusted image signal.

24. The electronic still camera of claim 23, further comprising a recording device coupled to said white balance adjustment device to record said adjusted image signal.

25. The electronic still camera of claim 23, further comprising:
a water depth measuring sensor that measures a difference in water depth between said camera and said photographed subject, an output of said water depth measuring sensor coupled to said controller, said controller producing said color balance adjustment signal in accordance with the difference in water depth measured by said water depth measuring sensor.

26. The electronic still camera of claim 25, wherein said water depth measuring sensor includes a camera inclination measuring sensor and a photographed subject distance measuring sensor, said water depth measuring sensor determines said difference in water depth based upon a camera inclination determined by said camera inclination measuring sensor and a photographed subject distance determined by said photographed subject distance measuring sensor.

27. The electronic still camera of claim 23, further comprising:

a manually settable photography selection device coupled to said controller and being settable between a first mode for photography underwater and a second mode for photography on land, said controller producing said color balance adjustment signal when said first mode is set.

28. The electronic still camera of claim 23, further comprising:
a light device that illuminates the photographed subject, said controller producing said color balance adjustment signal so as to compensate for the decrease in the red color component of light rays from the light device that enter the photographed subject to reflect and reach the camera after passing through water.

29. The electronic still camera of claim 23, further comprising:
a distance measuring device coupled to said controller and measuring a subject distance between said camera and said photographed subject; said controller producing said color balance adjustment signal in accordance with the subject distance measured by said distance measuring device.

30. The electronic still camera of claim 23, further comprising:
an electronic display, said controller controlling said electronic display to display said adjusted image signal prior to picture taking.

31. The electronic still camera of claim 23, wherein said color balance adjustment signal indicates red, green and blue gains to be used by said white balance adjustment device to adjust said image signal.

32. An electronic still camera comprising:
a photoelectric imaging element that outputs an image signal when a photographic subject is photographed by said photoelectric imaging element;
a lens system that forms a light image of a photoqraphed subject on said imaging element;
said photoelectric imaging element outputs said image signal based on said light image;
a white balance measuring device that measures a white balance of light in a vicinity of the camera;
a controller coupled to said white balance measuring device to receive the measured white balance of light in the vicinity of the camera to produce a color balance adjustment signal that compensates for decrease in a red color component of light rays from the photographed subject that enter the camera after passing through water; and
an underwater discrimination sensor that discriminates whether the camera is underwater, an output of said underwater discrimination sensor coupled to said controller, and said controller calculating said color balance adjustment signal when said underwater discrimination sensor determines that the camera is underwater.

33. The electronic still camera of claim 32, wherein said underwater discrimination sensor includes a pair of electrodes spaced from each other on a surface of said camera.

34. The electronic still camera of claim 33, wherein said underwater discrimination sensor further includes a protrusion located on said camera surface between said pair of electrodes.

35. The electronic still camera of claim 33, wherein said underwater discrimination sensor is formed of water-repellant synthetic resin.

36. The electronic still camera of claim 32, further comprising a waterproof casing surrounding said camera, wherein said underwater discrimination sensor includes a switch on an outer surface of said camera that engages a member on an inner surface of said waterproof casing.

37. A method of performing photography of an underwater subject with an electronic still camera having an imaging element that outputs an image signal when a photographic subject is photographed by said imaging element, and a recording device that records said image signal, said method comprising:
measuring a white balance in a vicinity of the camera using a white balance measuring device provided in the camera; and
adjusting the white balance of the image signal output by said imaging element based on the white balance measured by said white balance measuring device so as to compensate for decrease in a red color component of light rays from the photographed subject that enter the camera after passing through water.

38. The method of claim 37, further comprising:
determining whether the photographed subject is underwater using an underwater discrimination device provided in the camera; and adjusting the white balance of said image signal when said underwater discrimination device determines that the photographed subject is underwater.

39. The method of claim 37, further comprising:
measuring a difference in water depth between said camera and said photographed subject using a water depth measuring device provided in the camera; said white balance of said image signal being adjusted in accordance with the measured difference in water depth.

40. The method of claim 37, further comprising:
measuring a subject distance between said camera and said photographed subject using a distance measuring device provided in the camera; said white balance of said image signal being adjusted in accordance with the subject distance measured by said distance measuring device.

41. The method of claim 37, further comprising:
displaying, on a display of the camera prior to picture taking, the image signal after the white balance of the image signal has been adjusted.

42. The method of claim 37, wherein said step of adjusting the white balance of the image signal includes adjusting gains of red, green, and blue components of the image signal output by said imaging element.

43. The method of claim 38, wherein said step of determining whether the camera is located underwater includes determining whether the camera is in a waterproof casing.

44. The method of claim 39, wherein said step of measuring the water depth includes determining an inclination of said camera.

* * * * *